United States Patent [19]

Debreczeni

[11] Patent Number: 5,050,333

[45] Date of Patent: Sep. 24, 1991

[54] FISHING RIG

[76] Inventor: Joe Debreczeni, 695 Victor Hugo, Brossard Quebec, Canada

[21] Appl. No.: 619,489

[22] Filed: Nov. 29, 1990

[51] Int. Cl.$^5$ .................... A01K 97/01; A01K 97/10; A01K 97/12

[52] U.S. Cl. ......................................... 43/17; 43/15; 43/16

[58] Field of Search ............................... 43/15, 16, 17

[56] References Cited

U.S. PATENT DOCUMENTS

| | | | |
|---|---|---|---|
| 2,624,972 | 1/1953 | Burg | 43/17 |
| 3,147,563 | 9/1964 | Molter | 43/17 |
| 3,199,241 | 8/1965 | Mauritz | 43/17 |
| 3,447,254 | 6/1969 | Sobel | 43/20 |
| 3,824,730 | 7/1974 | Johnson | 43/17 |
| 3,888,035 | 6/1975 | Totten et al. | 43/17 |
| 4,373,287 | 2/1983 | Grahl | 43/17 |
| 4,567,686 | 2/1986 | Akom | 43/17 |
| 4,633,608 | 1/1987 | Savarino | 43/17 |

Primary Examiner—Richard K. Seidel
Assistant Examiner—Jeanne M. Elpel
Attorney, Agent, or Firm—Cushman, Darby & Cushman

[57] ABSTRACT

A portable knockdown fishing rig which includes a base, a fishing rod support, a flag and staff having its lower end mounted to the base and its upper end adapted, in a flexed condition, to be loosely engaged to a line responsive triggering mechanism also mounted to the support. A pulling force exerted on the fishing line causes the triggering mechanism to release the flag staff thus indicating the catch of a fish. In one embodiment, the upper part of the support is so shaped as to oppose tilting of the entire fishing rig when an important pulling force is exerted.

19 Claims, 4 Drawing Sheets

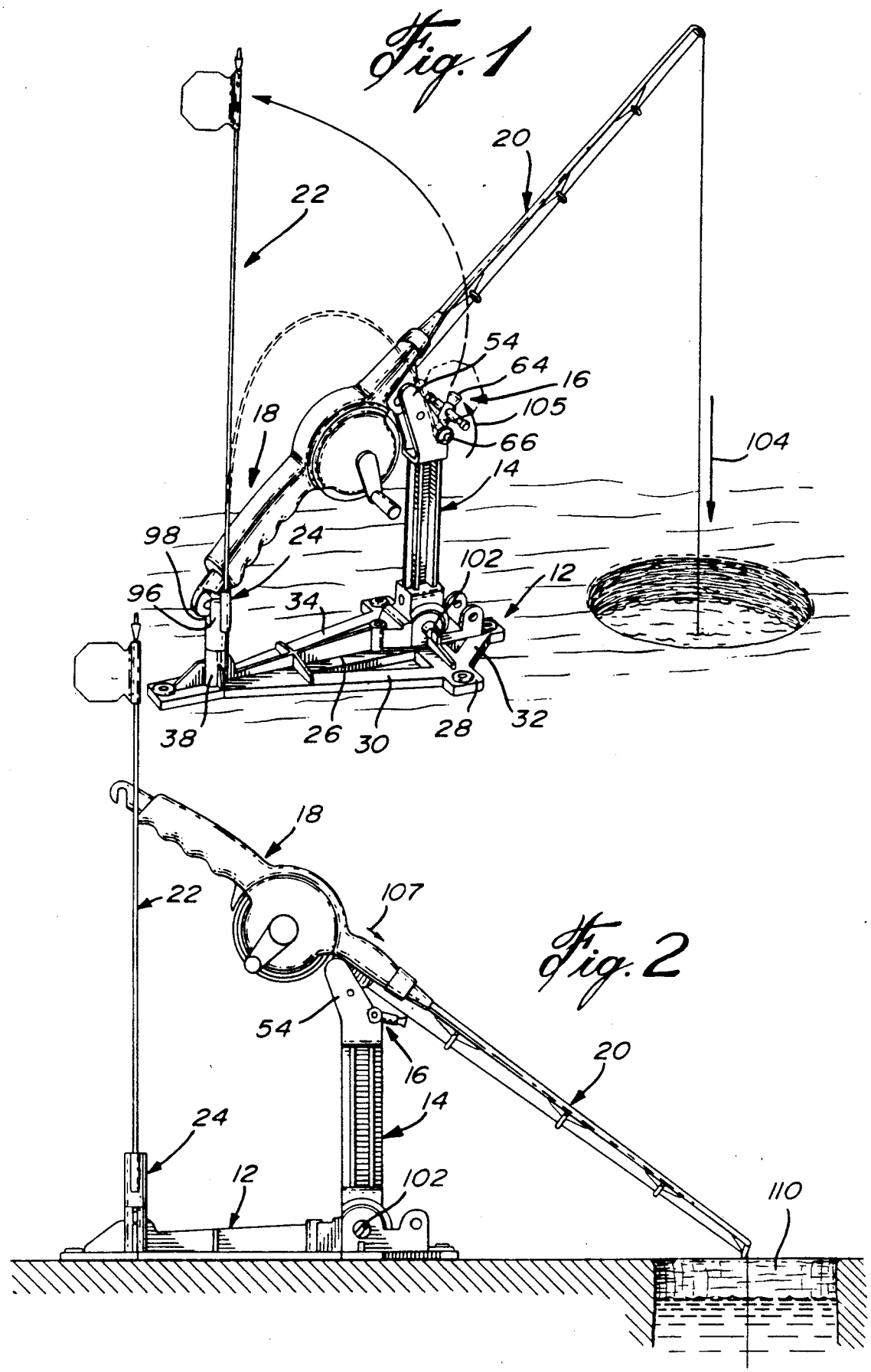

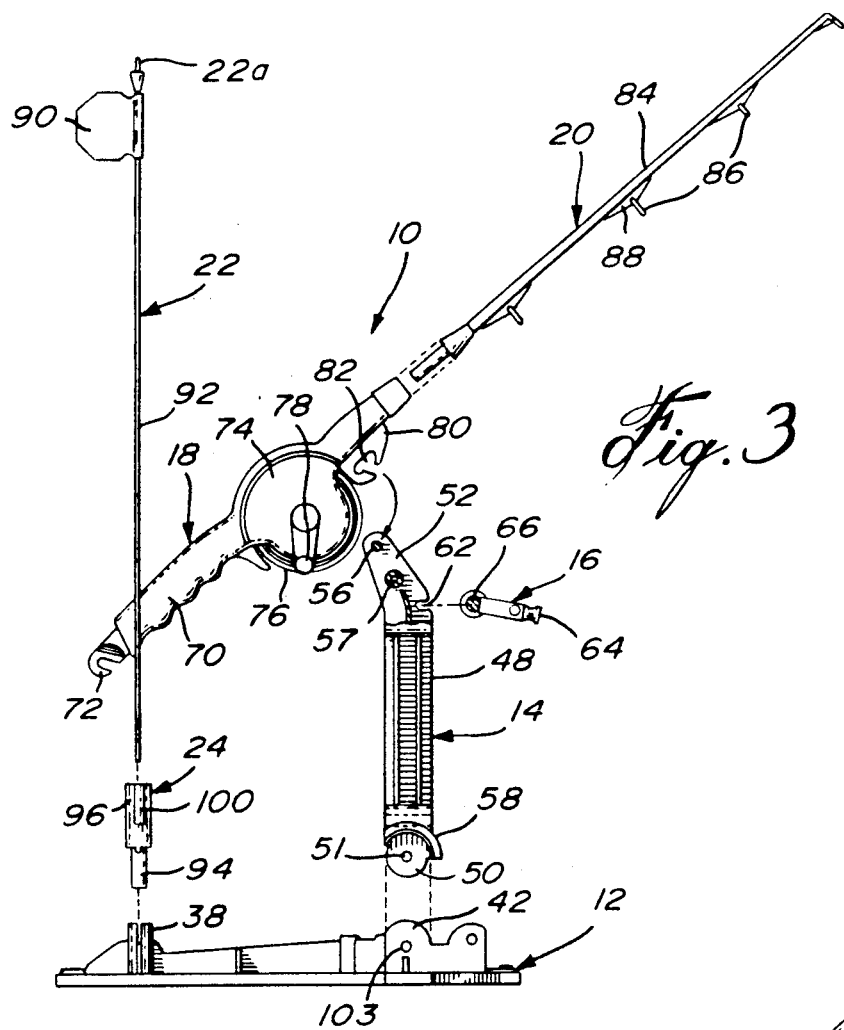
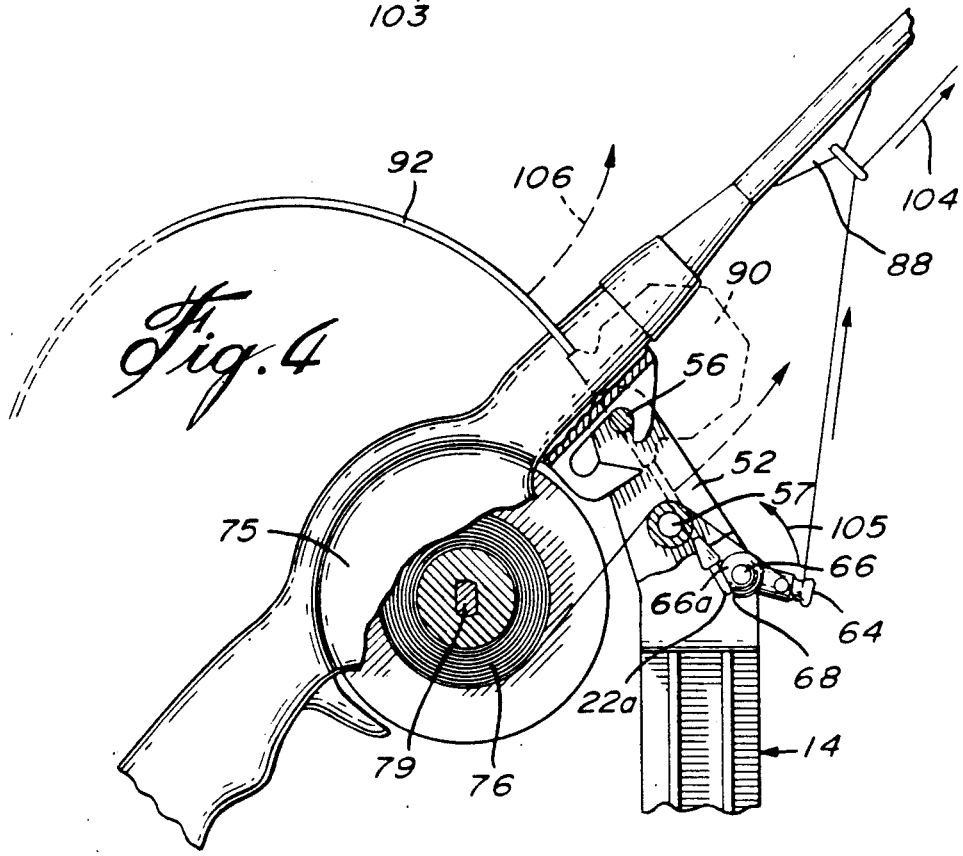

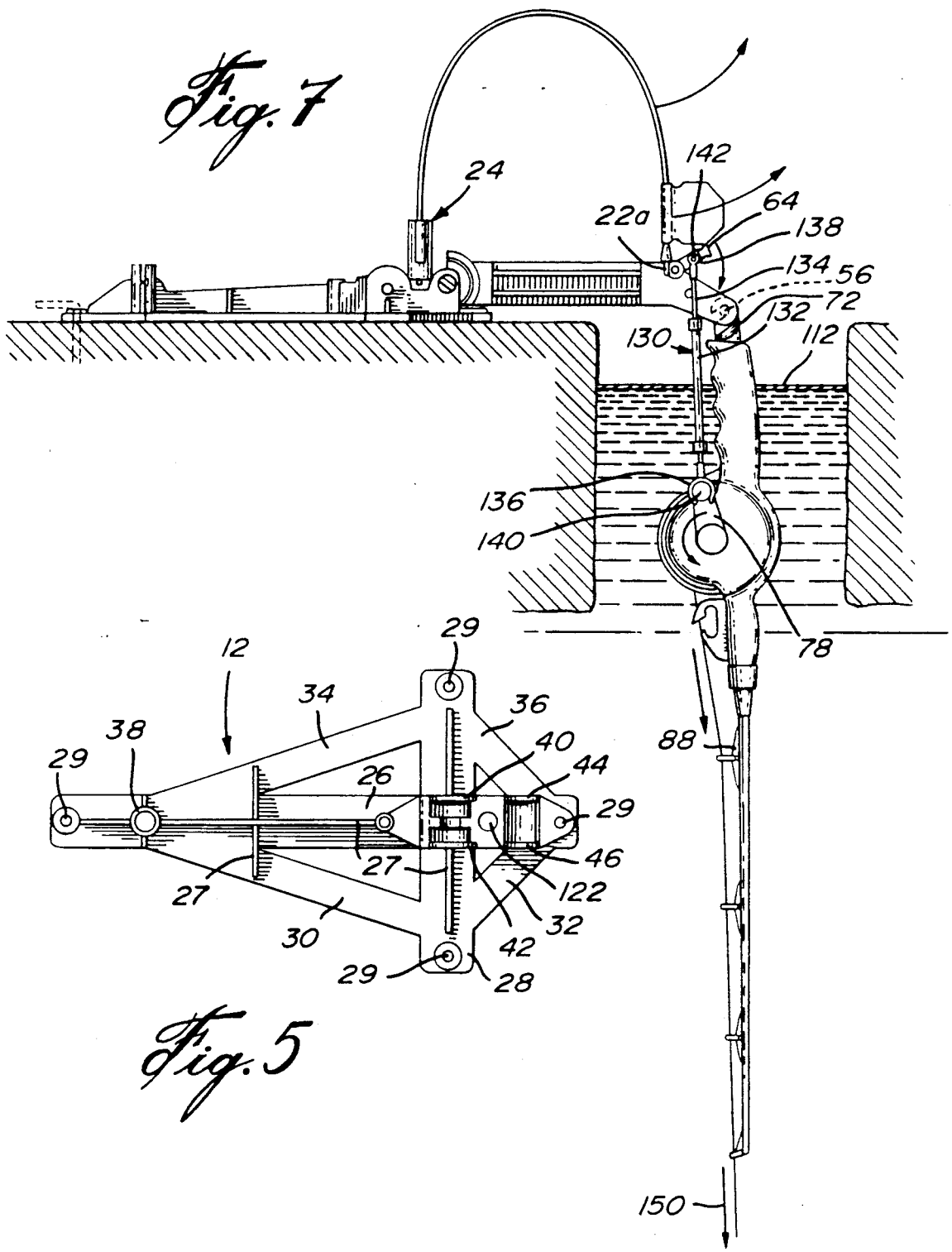

ed on the
FISHING RIG

FIELD OF THE INVENTION

The present invention relates to a fishing rig of the type which is positioned over a fishing hole cut through an ice surface and which provides a signal when a fish strikes the line.

BACKGROUND OF THE INVENTION

It is common in ice fishing to provide, adjacent a hole cut through the ice surface, a support on which a fishing rod is positioned. It is also common to provide, on such support, an indicator, such as a flag, which is actuated when the bait has been hooked in order to draw the fisherman's attention.

The use of signaling flags, in combination with fishing rigs, is known in the art; for example, U.S. Pat. No(s). 3,824,730 issued July 23, 1974 to Johnson and 4,373,287 issued Feb. 15, 1983 to Grahl describe fishing rod holders of the type having a signaling means to indicate a pull on the line. However, none of these devices uses the line for directly triggering the mechanism that holds the flag. Obviously, a pull exerted by a fish is first sensed by the fishing line and, consequently, triggering mechanisms ought to be actuated as soon as the line is tugged.

In some fishing rigs, the flag is raised only when the fishing rod has gone from a tip-up to a tip-down position adjacent the hole in the ice surface.

It has also been observed, in other fishing rigs that a pull by a fish not only causes the pivotal movement of the fishing rod, but also of the entire rig including its supporting base. In cases where the ice hole is relatively large, the entire fishing rig may be lost through the hole.

OBJECTS AND STATEMENT OF THE INVENTION

It is an object of the present invention to provide a fishing rig which overcomes the above problems.

It is an object of the present invention to provide a fishing rig where the pull caused by a fish tugging on line is immediately sensed by a triggering mechanism to cause the immediate release of the flag.

The present invention therefore relates to a fishing rig which comprises:

a base adapted to reside, when in use, atop a supporting surface, the base embodying a front portion and a rear portion;

an upright mounted, when in use, to the front portion of the base and including a rearwardly extending oblique upper portion, defining a fulcrum point thereon;

a tiltable fishing rod mounted, when in use, to the fulcrum point and defining first and second sections on either side of the fulcrum point, the first section including a line supporting pole and the second section including a handle and a line reel; the rod further including means for mounting the upper portion to the fulcrum point;

a flag including a flexible staff having a lower end thereof mounted to the base;

means adapted to reside, when in use, at the rear portion of the base for supporting the second section of the fishing rod in a tip-up position; and triggering means pivotally mounted to the upright, including line engaging means and flag engaging means adapted to contact the upper end of the staff, when in a flexed condition, whereby a pull on the line causes the triggering means to pivot to thus free the upper end of the staff.

This invention thus allows the flag to be raised even though the fishing rod, which is tiltably mounted on the upright has not moved to a tip-up position to a tip-down position because the pulling force was not sufficient to cause the fishing rod to tilt.

Furthermore, the present invention provides a fishing rig where its upright is so structured that, with the fishing rod in its tip-down position, the pulling force is opposed by the structure of the upright thus preventing a tilting of the entire fishing rig.

In one form of the invention, the fishing rig is formed of a series of elements which may be dismounted and assembled so as to be easily portable and storable.

Further, the rig is so structured that it may be used with most of its components to define another embodiment wherein the fishing rod is suspended over the hole with a portion thereof extending through the hole and in the water.

The present invention therefore relates to a rig for fishing adjacent a hole cut through an ice surface, which comprises:

base means adapted to reside, when in use, atop the ice surface;

support means having one end mounted, when in use, to the base means and the opposite end adapted to extend over the hole;

a fishing rod suspended, when in use, to the opposite end of the support means and extending downwardly through the hole, the rod including a line supporting pole, a rotatable line reel and a handle; the line reel including a manually operatable lever;

flag means including a flexible staff having a lower end thereof mounted to the base means; and flag triggering means pivotally mounted to the opposite end portion of the support means, the triggering means including: staff engaging means adapted to contact an opposite end of the staff, when in a flexed condition; and telescopic means having one end pivotally connected to the flag engaging means and the other end pivotally connected to the lever whereby a pulling force on the line causes the reel and the lever to rotate and, consequently, through the telescopic means, causes the engaging means to free the opposite end of the staff.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

IN THE DRAWINGS

FIG. 1 is a perspective view of a first embodiment of a fishing rig made in accordance with the present invention, shown in a tip-up position on an ice surface and located adjacent a hole cut through the ice;

FIG. 2 is a side elevation thereof with the fishing rod in a tip-down position;

FIG. 3 is a side exploded view showing the various components of the fishing rig;

FIG. 4 is an enlarged side view, partly sectional, showing the triggering mechanism of the present invention;

FIG. 5 is a top plan view of the base of the fishing rig;

Figure 8:
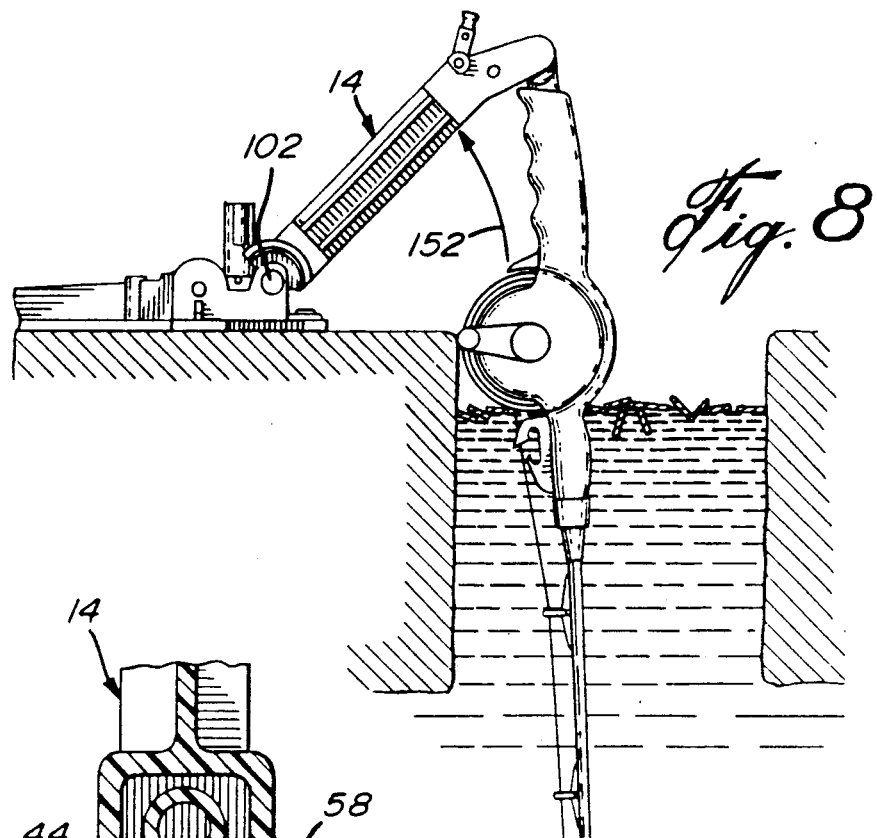

FIG. 7, which is illustrated on the same sheet as that showing FIG. 5, is a side view of another embodiment of a rig with the rod partly submerged through the ice hole;

FIG. 8 is a view similar to FIG. 7 showing the rod being raised; and

Figure 9:
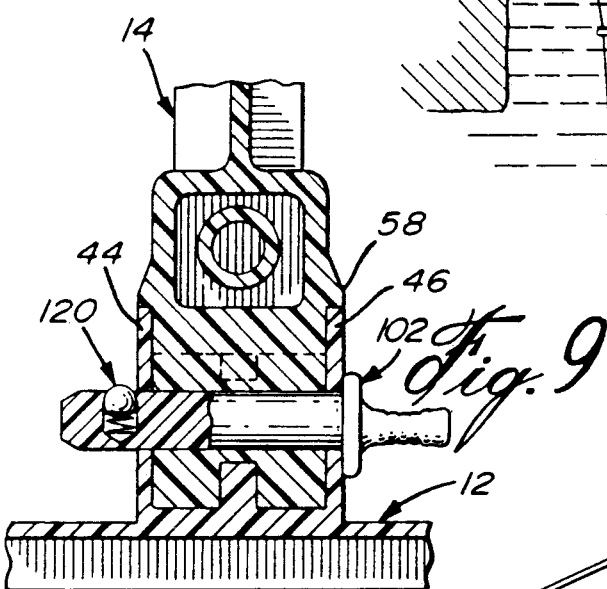

FIG. 9 is a cross-sectional view showing the connection of the rod support with the base.

DESCRIPTION OF PREFERRED EMBODIMENT

Referring to FIGS. 1 and 2, the present invention concerns a fishing rig consisting of seven components including: a base 12, an upright 14, a triggering device 16, a fishing rod including a handle portion 18 and a pole portion 20, a flag with staff 22 and a fitting 24.

The base 12 (see FIG. 5) is a unitary plastic molded member consisting of a longitudinal central member 26 and of a cross member 28, both of which are reinforced by the presence of opposite oblique side members 30 and 32, 34 and 36. The rear of the base displays an upstanding cylindrical hollow portion 38 while the front of the base displays, on the central member 26, two successive pairs of ears 40, 42 and 44, 46. The bottom face of the central member 26 between the pairs of ears is concave as explained further hereinbelow. Members 26 and 28 each have reinforcing ribs 27 and their extremities each have a hole 29 allowing the base to be fixed to the ice surface or other supporting surface.

Referring to FIG. 3, the upright 14 comprises a vertical portion 48 with a rounded base 50 which is adapted to be received between the two ears 40 and 42 and on the concave lower surface therebetween on the base. The upper portion of the upright 48 is rearwardly oblique and is defined by a pair of spaced side members 52 and 54 defining a yoke. A pair of cross-pins 56 and 57 extends transversely between the two members 52 and 54. The lower end of the upright has two opposite rounded flanges 58 which are adapted to sit and ride on the upper rounded edges of the ears 40 and 42. The lower end of the oblique side members 52 and 54 displays a rounded recess 62 at the front thereof.

The triggering mechanism 16 is a T-shaped member integrally formed, at its base, with a transverse pivot 66 having two grooved areas which are adapted to be fittingly inserted into the rounded recesses 62 of each member 52, 54 of the yoke. The opposite extremities of shaft 66 have a semi-spherical surface 66a; however, as can be seen in FIG. 4, one extremity of this surface has a segmented portion 68, the function of which will be described hereinafter.

The handle portion 18 of the fishing rod includes a hand gripping section 70, having a hook-like extremity 72, and a housing 74 which is formed of opposite circular side extensions 75. A reel 76 is rotatably secured in housing 74 by means of a manual lever 78 which has a rectangular cross-member 79. Openings are provided in both circular side extensions of the housing 74 so that lever 78 may be located on either side (for left-handed or right-handed fishermen). Portion 18 of the handle also comprises a C-shaped catch 80 defining an open slot 82 in which is positioned the cross-pin 56 of the upright which acts as a fulcrum point when the fishing rod is placed on the upright.

The other portion 20 of the fishing rod comprises a standard pole 84 with circular rings 86 through which extends a fishing line 88, the pole being tight fitted in the extremity of the handle portion 18.

The flag 22 consists of a visual signaling element 90 adjacent its extremity 22a and of a flexible staff 92.

Fitting 24 comprises a cylindrical lower portion 94 which is adapted to be snuggly received in the hollow cylindrical extension 38 of the base. It further comprises, at the upper portion, two space side members 96 and 98 between which is adapted to sit the extremity 72 of the fishing rod. One side member 96 includes, on its outer wall, a cylindrical hollow housing 100 to receive the lower end of the flexible staff 92. Fitting 24 thus serves to support the flag as well as the fishing rod when in a tip-up position.

The assembly of the fishing rig is accomplished as follows. The upright 14 is positioned vertically with its base 50 inserted between the two supporting ears 40 and 42 of the base. A locking pin 102 (see FIG. 1) is inserted through an appropriate side opening 103 in each ear in registry with hole 51 of the upright (see FIG. 3). The fishing rod is then positioned so that its catch 80 engages the cross pin 56 of the upright (as shown in FIG. 4); with the fishing rod placed in its tip-up position, extremity 72 of the rod is received between the two sides members 96 and 98 of fitting 24. The lower end of the flag staff is fitted in the cylindrical housing 100. The flag staff is then flexed and its upper extremity 22a is located to abut the segmented portion 68 of the end surface 66a of pivot 66. Line 88 is then pulled away from the pole and loosely fitted around the head 64 of the T-shaped portion of the triggering device.

Referring to FIG. 4, whenever a pull is exerted on the line in the direction indicated by arrow 104, the triggering device 16 pivots about its axis 66 (as indicated by arrow 105). As the semi-spherical surface 66a, rotates, it slides under the staff extremity 22a thus releasing the staff to its normal vertical position (as indicated by arrow 106). Also, the line is freed from head 64.

Figure 6:
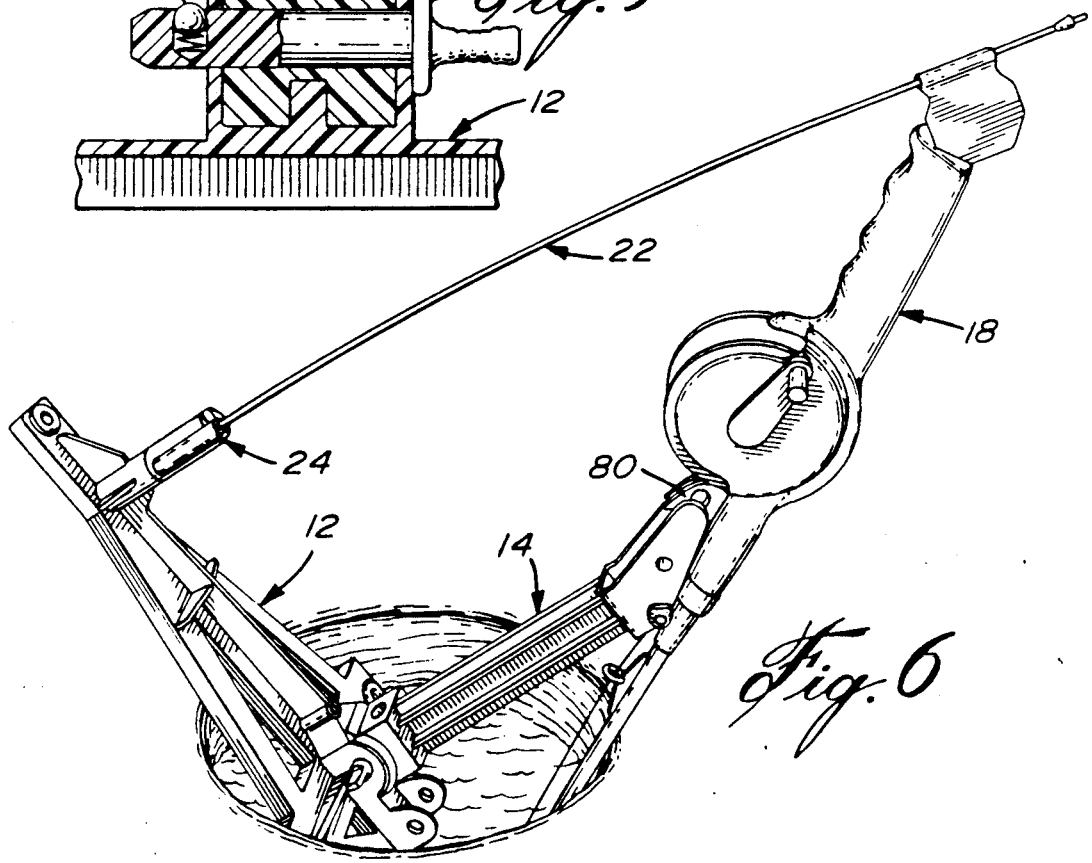
FIG. 6 is a perspective view of the fishing rig jammed in the ice hole.

As the pull becomes significant, the fishing rod pivots about axis 56 and adopts the position shown in FIG. 2 with its tip down over hole 110. In this position, cross-pin 56 now slides in the uppermost extremity of slot 82 of catch 80. The obliqueness of portion 54 relative to the main vertical portion of the upright 14 provides maximum resistance to the pull in the direction 107 (in FIG. 2). The opposing force is in line with the pulling force of the rod. If the upright were in a vertical position, there would be a tendency for the entire assembly to pivot with the possibility of the rod being unhooked and being pulled into the hole. On the other hand, with the arrangement shown in the drawings where the base is not secured to the ice surface, there is tendency of the assembly to be drawn or to slide on the ice surface to a position adjacent the hole. In cases where an important pull would cause the assembly to reach the position such as shown in FIG. 6, it can be seen that the particular structural supporting configuration of the rod to the upper part of the upright makes it difficult for the fishing rod to be removed from the upright. As shown in FIG. 6, a relatively large hole would be required for the entire fishing rig to be drawn underwater.

Another feature of the present invention resides in the particular construction of the base 12, which allows fishing to be carried out in the manner shown in FIG. 7. This may be preferred in cases where movement of the fishing rod in the water is desired to effect continuous breakage of the thin ice 112 being formed on the surface of the water. Still, in cases where there is not sufficient movement of the rod to cause ice breakage, the retrieval of the fishing rod (as indicated by arrow 152 in FIG. 8) by pivoting the upright 14 about pivot 102 will break the thin ice layer.

The upright is, in this case, positioned horizontally between the frontmost ears 44 and 46 of the base and is secured therebetween by means of a pin 102 with the opposite arcuate portions 58 resting on the corresponding upper edges of the ears (see FIG. 9). A ball-and-spring arrangement 120 may be used to secure the pin 102 in the assembly of the upright 14 to the base 12.

The base includes an opening 122 rearwardly of ears 44 and 46 so that the lower cylindrical portion 94 of fitting 24 may be received therein (see FIG. 7).

In this arrangement, all of the components of the embodiment illustrated in FIGS. 1 to 6 are used; however, an additional member is required. Indeed, an elongate extension member 130 formed of two telescopically engaged members 132 and 134 is used. Each member has a C-shaped extremity 136, 138 for respectively engaging the cylindrical portion 140 of the lever 78 and one of the two side arms 142 of the T-shaped triggering device 16. In this embodiment the engagement of the flag staff extremity 22a with the triggering device 16 is accomplished in the same manner as that described above with respect to FIGS. 1 to 6. A pull on line 88 in the direction of arrow 150 causes the rotation of the lever 78 and, through its telescopic connecting member 130, the pivotal movement of device 16 which then triggers the release of staff 22 again in the same manner as that described above.

As illustrated in FIG. 8, retrieval of the fishing rod is accomplished by simply pivoting the upright 14 about pin 102 in the direction of arrow 152.

Although the invention has been described above with respect with two specific forms, it will be evident to a person skilled in the art that it may be modified and refined in various ways. For example, although not described, the base may be constructed in a manner that all of the other components of the rig may be snuggly received thereon. It is therefore wished to have it understood that the present invention should not be limited in scope, except by the terms of the following claims.

The embodiments of the invention in which an exclusive property or privilege is claimed are defined as follows:

1. A fishing rig comprising, in combination:
   base means adapted to reside, when in use, atop a supporting surface, said base means embodying a front portion and a rear portion;
   upright means mounted, when in use, to said front portion of said base means and including a rearwardly extending oblique upper portion defining a fulcrum point thereon;
   a tiltable fishing rod mounted, when in use, to said fulcrum point and defining first and second sections on either side of said fulcrum point, said first section including a line supporting pole; said second section including a handle and a line reel; further including means for mounting said rod to said fulcrum point;
   flag means including a flexible staff having a lower end thereof mounted to said rear portion of said base means;
   means adapted to reside, when in use, at said rear portion of said base means for receiving the lower end of said flexible staff and for supporting said second section of said fishing rod; and
   triggering means pivotally mounted to said upright means, said triggering means including line engaging means and flag engaging means adapted to contact an opposite end of said staff, when flexed, whereby a pulling force on said line causes said triggering means to pivot to thus free said opposite end of said staff.

2. A fishing rig as defined in claim 1, wherein said triggering means consist of a body having:
   a) a pivot axis having, at one end thereof, surface means adapted to abuttingly contact said opposite end of said staff; and
   b) a stem having one end integral with said axis and the opposite end thereof freely receiving said line; said line being freed from said opposite end when the pulling force on said line frees said abutting contact thereby causing pivotal movement of said axis and freeing said opposite end of said staff from said surface means.

3. A fishing rig as defined in claim 2, wherein said surface means is segmented with said opposite end of said staff contacting said segmented surface means.

4. A fishing rig as defined in claim 2, wherein said stem is T-shaped.

5. A fishing rig as defined in claim 2, wherein said triggering means is mounted at the base of said oblique upper portion of said upright means.

6. A fishing rig as defined in claim 5, wherein said oblique upper portion has the shape of a yoke.

7. A fishing rig as defined in claim 6, wherein said fulcrum point consists of a transverse pin extending in the upper portion of said yoke.

8. A fishing rig as defined in claim 6 or 7, further comprising a cross pin in said yoke to receive thereon said line extending between said reel and said triggering means.

9. A fishing rig as defined in claim 7, wherein said means for mounting said rod to said fulcrum point consists of a C-shaped element receiving said transverse pin therein.

10. A fishing rig as defined in claim 1, comprising, at said rear portion of said base, a removable support to receive the lower end of said flexible staff.

11. A fishing rig as defined in claim 10, wherein said support comprises means to receive a rear end of said handle of said fishing rod.

12. A fishing rig as defined in claim 1, further comprising removable pivot means for engaging the lower end of said upright means to said front portion of said base.

13. A rig for fishing adjacent a hole cut through an ice surface comprising, in combination:
   base means adapted to reside, when in use, atop said ice surface;
   support means having one end mounted, when in use, to said base means and the opposite end adapted to extend over said hole;
   a fishing rod suspended, when in use, to said opposite end of said support means and extending downwardly through said hole, said rod including a line supporting pole, a rotatable line reel and a handle; said line reel including a manually operable lever;
   flag means including a flexible staff having a lower end thereof mounted to said base means; and
   flag triggering means pivotally mounted to said opposite end portion of said support means, said triggering means including: staff engaging means adapted to contact an opposite end of said staff, when in a flexed condition; and telescopic means having one end pivotally connected to said flag engaging means and the other end pivotally connected to said lever whereby a pulling force on said line causes said reel and said lever to rotate and, consequently, through said telescopic means, causes said engaging means to free said opposite end of said staff.

14. A rig as defined in claim 13, wherein said flag engaging means consist of (a) a pivot axis having, at one end thereof, surface means adapted to abuttingly contact said opposite end of said flag and (b) a stem having means receiving said one end of said telescopic means.

15. A rig as defined in claim 14, wherein said surface means is segmented with said opposite end of said flag contacting said segmented surface means.

16. A rig as defined in claim 13, wherein said opposite end of said support means has the shape of a yoke displaying a transverse pin therein.

17. A rig as defined in claim 16, wherein said handle of said fishing rod includes, at one end thereof, hook means adapted to be freely suspended from said transverse pin.

18. A rig as defined in claim 13, further comprising removable pivot means for engaging said one end of said support means to said base means.

19. A rig as defined in claim 13, further comprising means adapted to be mounted to said base means

* * * * *